(12) United States Patent
Wen et al.

(10) Patent No.: US 9,536,459 B2
(45) Date of Patent: Jan. 3, 2017

(54) TESTING DEVICE AND TESTING METHOD FOR DISPLAY PANELS

(75) Inventors: Songxian Wen, Shenzhen (CN);
Jungmao Tsai, Shenzhen (CN);
Shiue-shih Liao, Shenzhen (CN);
Yizhuang Zhuang, Shenzhen (CN);
Mingfeng Deng, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 51 days.

(21) Appl. No.: 13/703,356

(22) PCT Filed: Aug. 28, 2012

(86) PCT No.: PCT/CN2012/080662
§ 371 (c)(1),
(2), (4) Date: Dec. 11, 2012

(87) PCT Pub. No.: WO2014/023049
PCT Pub. Date: Feb. 13, 2014

(65) Prior Publication Data
US 2015/0145549 A1 May 28, 2015

(30) Foreign Application Priority Data
Aug. 6, 2012 (CN) .......................... 2012 1 0276942

(51) Int. Cl.
*G09G 3/00* (2006.01)
*G02F 1/13* (2006.01)
*G02F 1/133* (2006.01)
*G02F 1/1345* (2006.01)

(52) U.S. Cl.
CPC ............. *G09G 3/006* (2013.01); *G02F 1/1309* (2013.01); *G02F 1/13306* (2013.01); *G02F 1/13452* (2013.01)

(58) Field of Classification Search
CPC ... G02F 1/1309; G02F 1/13306; G02F 1/13452;
G02F 1/1343; G02F 1/1345; G02F
1/136259; G02F 1/13454; G02F 1/13458;
G02F 1/136204; G02F
2001/136254; G09G 3/006; G09G 3/3648;
G09G 2330/10; G09G 2300/0426; G02R
1/13452
USPC ...................................... 324/760.01–760.02,
750.01–750.3,324/754.01–754.2,
755.01–755.11,324/756.01–756.07,
760.01–763.02,324/760.01–760.2,
762.01–762.06, 763.01; 349/149, 192
See application file for complete search history.

(56) References Cited

U.S. PATENT DOCUMENTS

| | | | |
|---|---|---|---|
| 5,543,729 A * | 8/1996 | Henley | G01R 31/308 324/760.02 |
| 5,608,558 A * | 3/1997 | Katsumi | 349/192 |
| 6,300,998 B1 * | 10/2001 | Aruga | G09G 3/006 349/192 |
| 6,603,467 B1 * | 8/2003 | Wu | H05K 3/243 204/403.01 |

(Continued)

*Primary Examiner* — Tung X Nguyen
*Assistant Examiner* — Lee Rodak
(74) *Attorney, Agent, or Firm* — Mark M. Friedman

(57) ABSTRACT

The present invention provides a testing device and a testing method. The testing method comprises: providing a testing device; bonding at least one connecting terminal of the testing device to signal lines of the display panel; and inputting test signals to the signal lines of the display panel through at least one test contact of the testing device. In the present invention, it is not required to arrange shorting bars on the display panel.

7 Claims, 3 Drawing Sheets

(56) References Cited

U.S. PATENT DOCUMENTS

| | | | |
|---|---|---|---|
| 6,859,053 B1* | 2/2005 | Sato et al. | 324/756.03 |
| 2002/0075439 A1* | 6/2002 | Uehara | 349/149 |
| 2006/0176071 A1* | 8/2006 | Yamagishi et al. | 324/770 |
| 2009/0273753 A1* | 11/2009 | Park | 349/152 |

* cited by examiner

TESTING DEVICE AND TESTING METHOD FOR DISPLAY PANELS

FIELD OF THE INVENTION

The present invention relates to a field for testing display panels, and more particularly to a testing device and a testing method for display panels.

BACKGROUND OF THE INVENTION

Liquid crystal displays (LCDs) have been widely applied in electrical products, wherein LCD panels are important components of the LCDs.

After the LCD panels are made, in general, makers of the LCD panels will test the LCD panels to find problem products and to reduce a waste in follow-up processes. Currently, in the test process of the LCD panels, shorting bars are disposed on an array substrate of the LCD panel and connected to signal lines 220 of the LCD panel. Test signals are inputted to the signal lines through the shorting bars for testing whether the signal lines are broken or have defects. After the test process, the connections between the shorting bars and the signal lines are cut off by a laser.

It is necessary to add a laser cutting process for cutting off the shorting bars after testing the LCD panels, thereby deteriorating a production capacity and a process yield of the LCD panels. Moreover, it is required to waste the space on the LCD panel for arranging the shorting bars. In addition, after cutting off the shorting bars, the LCD panel can not be tested again.

As a result, it is necessary to provide a testing device and a testing method to solve the problems existing in conventional technologies such as above-mentioned.

SUMMARY OF THE INVENTION

The present invention provides a testing device and a testing method to solve the test problems existing in conventional LCD panel.

A primary object of the present invention is to provide a testing device for testing a display panel, and the testing device comprising: a test substrate; at least one connecting terminal arranged at one side of the test substrate configured to be connected to signal lines of the display panel; at least one test contact disposed on the test substrate; and at least one connecting line connected between the connecting terminals and the test contact.

Another object of the present invention is to provide a testing device for testing a display panel, and the testing device comprising: a test substrate; a plurality of connecting terminals arranged at one side of the test substrate configured to be connected to signal lines of the display panel, wherein a width of each of the connecting terminals is larger than a width of an input terminal of each of the signal lines, and the width of each of the connecting terminals is less than 300 µm; at least one test contact disposed on the test substrate; and at least one connecting line connected between the connecting terminals and the test contact.

In one embodiment of the present invention, the test substrate is a printed circuit board (PCB) or a flexible printed circuit (FPC) board.

In one embodiment of the present invention, the at least one connecting terminal comprises a plurality of connecting terminals, and a pitch between each adjacent two of the connecting terminals is identical to a pitch between each adjacent two of the signal lines.

In one embodiment of the present invention, a width of each of the connecting terminals is larger than a width of an input terminal of each of the signal lines.

In one embodiment of the present invention, the width of each of the connecting terminals is less than 300 µm.

In one embodiment of the present invention, the at least one test contact comprises a first test contact, a second test contact, a third test contact, and the first test contact is configured to test red pixels of the display panel, and the second test contact is configured to test green pixels of the display panel, and the third test contact is configured to test blue pixels of the display panel.

In one embodiment of the present invention, the connecting terminal is an elongated terminal, and a length of the connecting terminal is longer than an arrangement length of the signal lines.

In one embodiment of the present invention, the test substrate is configured to test data lines of the display panel, and the testing device further comprises another test substrate configured to test gate lines of the display panel.

Still another object of the present invention is to provide a testing method for testing a display panel, and the testing method comprising: providing a testing device, wherein the testing device comprises a test substrate, at least one connecting terminal, at least one test contact, and at least one connecting line, and the connecting terminal is arranged at one side of the test substrate, and the test contact is disposed on the test substrate, and the connecting line is connected between the connecting terminals and the test contact; bonding the connecting terminal of the testing device to signal lines of the display panel; and inputting test signals to the signal lines of the display panel through the test contact of the testing device.

The testing device of the present invention can be used for testing the signal lines or pixels of the display panel. With the use of the testing device of the present invention, the display panel can be tested without arranging shorting bars on the substrate thereof, thereby enhancing the utilization rate of the substrate thereof. Moreover, it is not required to use a laser to cut off the shorting bars, thereby preventing an additional laser cutting process, and the effect of the laser cutting process on the display panel is avoidable for ensuring a process yield of the display panel. In addition, with the use of the testing device, the spot test or multi-test can be carried out at random or limited to a specific display panel for meeting any test requirement, as well as improving a test quality for the display panel.

The structure and the technical means adopted by the present invention to achieve the above-mentioned and other objects can be best understood by referring to the following detailed description of the preferred embodiments and the accompanying drawings:

DETAILED DESCRIPTION OF THE PREFERRED EMBODIMENTS

Figure 1:
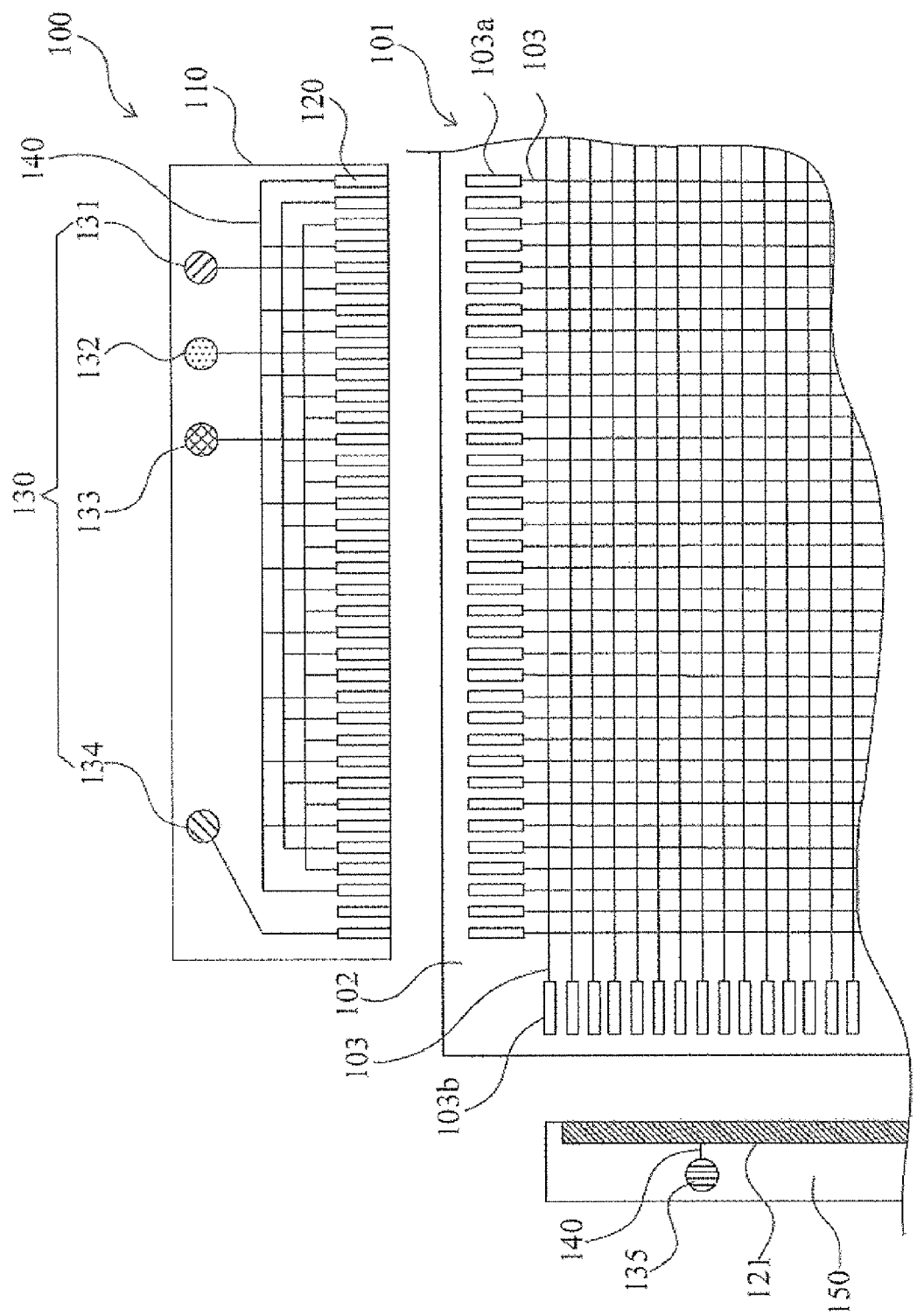
FIG. 1 is a schematic diagram showing a testing device and a display panel according to one embodiment of the present invention.

The following embodiments are referring to the accompanying drawings for exemplifying specific implementable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

The drawings and description are to be regarded as illustrative in nature and not restrictive. Like reference numerals designate like elements throughout the specification. In addition, the size and thickness of each component shown in the drawings are arbitrarily shown for understanding and ease of description, but the present invention is not limited thereto.

In the drawings, the thickness of layers, films, panels, regions, etc., are exaggerated for clarity. In the drawings, for understanding and ease of description, the thicknesses of some layers and areas are exaggerated. It will be understood that, when an element such as a layer, film, region, or substrate is referred to as being "on" another element, it can be directly on the other element or intervening elements may also be present.

In addition, in the specification, unless explicitly described to the contrary, the word "comprise" and variations such as "comprises" or "comprising" will be understood to imply the inclusion of stated elements but not the exclusion of any other elements. Furthermore, in the specification, "on" implies being positioned above or below a target element and does not imply being necessarily positioned on the top on the basis of a gravity direction.

Referring to FIG. 1, a schematic diagram showing a testing device and a display panel according to one embodiment of the present invention is illustrated. The testing device 100 of the present embodiment is configured to test signal lines of the display panel 101. The display panel 101 may be an LCD panel, an organic electro luminescence (OEL) display panel, an organic light emission diode (OLED) display panel or a plasma display panel (PDP). When the display panel 101 is the LCD panel, the display panel 101 and a backlight module can be assembled as an LCD apparatus. Referring to FIG. 1 again, the display panel 101 of the present embodiment comprises a substrate 102 which may be a glass substrate or a flexible and plastic substrate. A plurality of signal lines 103, such as data lines or gate lines, are arranged on the substrate 102. The signal lines 103 have exposed input terminals 103a which are positioned at one side of the signal lines 103 for receiving inputted signals, such as scan signals, data signals or test signals.

Referring to FIG. 1 again, the testing device 100 of the present embodiment comprises a test substrate 110, at least one connecting terminal 120, at least one test contact 130 and at least one connecting line 140. The connecting terminal 120, the test contact 130 and the connecting line 140 are formed on a surface of the test substrate 110. The connecting terminal 120 may be golden fingers which are positioned at one side of the test substrate 110 for contacting with the input terminals 103a of the signal lines 103 of the display panel 101. The at least one connecting line 140 is connected between the connecting terminal 120 and the test contact 130.

Figure 2:
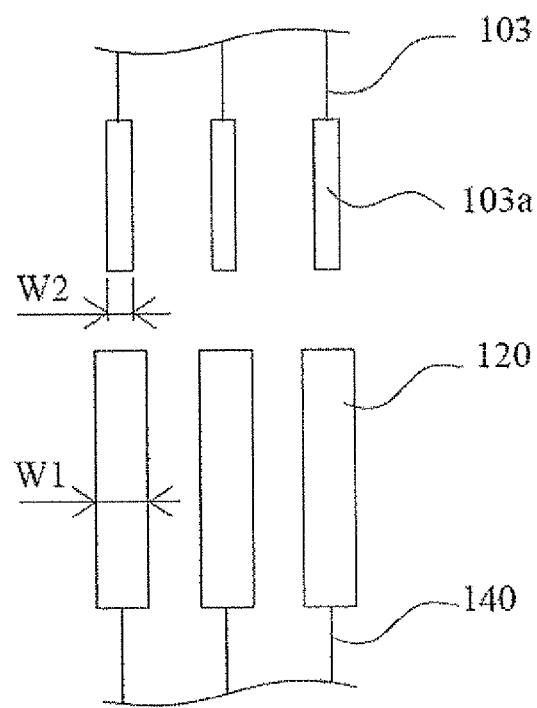
FIG. 2 is a schematic diagram showing connecting terminals of the testing device and the signal lines of the display panel according to one embodiment of the present invention.

Referring to FIG. 1 and FIG. 2, FIG. 2 is a schematic diagram showing connecting terminals of the testing device and the signal lines of the display panel according to one embodiment of the present invention. The test substrate 110 may be a printed circuit board (PCB) or a flexible printed circuit (FPC) board. In this embodiment, the testing device 100 can be used for testing the data lines of the display panel 101. In this case, the testing device 100 can have a plurality of connecting terminals 120 which are arranged at one side of the test substrate 110, and a pitch between each adjacent two of the connecting terminals 120 can be substantially identical to a pitch between each adjacent two of the signal lines 103, such that the connecting terminals 120 can be correspondingly positioned to the input terminals 103a of the signal lines 103 of the display panel 101. In this case, a width W1 of each of the connecting terminals 120 can be equal to or larger than a width W2 of each of the input terminals 103a. When the width W1 of the connecting terminals 120 is larger than a width W2 of the input terminals 103a, the contacts between the connecting terminals 120 and the input terminals 103a can be enhanced, so as to prevent that the connecting terminals 120 and the input terminals 103a are disconnected due to position errors. In this case, the width W1 of the connecting terminals 120 may be less than 300 μm, such as 120 μm~250 μm.

Referring to FIG. 1 again, when using the testing device 100 to test the data lines of the display panel 101, the at least one test contact 130 can comprise a first test contact 131, a second test contact 132, a third test contact 133 and a common voltage test contact 134. The first test contact 131 may be configured to test red pixels (not shown) of the display panel 101, and the second test contact 132 may be configured to test green pixels (not shown) thereof, and the third test contact 133 may be configured to test blue pixels (not shown) thereof, and the common voltage test contact 134 may be configured to test common electrodes thereof. The size of the test contact 130 may be larger than 1 mm, such as 1 mm~5mm, so as to make contacting the screen convenient for an external test machine or a test system. Corresponding to the four test contacts 131, 132, 133 and 134, four connecting line 140 are distanced from each other, and connected between the connecting terminals 120 and the test contacts 131, 132, 133 and 134, respectively.

Figure 3:
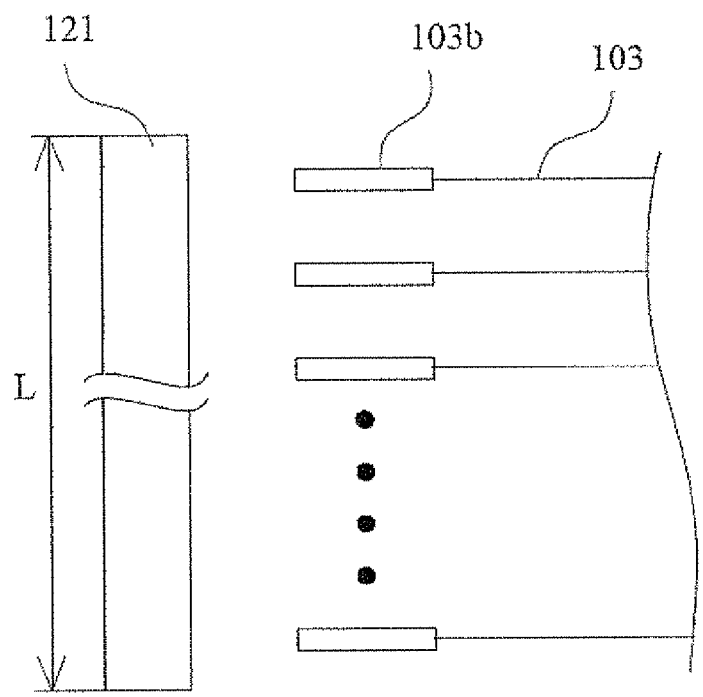
FIG. 3 is a schematic diagram showing one connecting terminal of the testing device and input terminals of the signal lines according to one embodiment of the present invention.

Referring to FIG. 1 and FIG. 3, FIG. 3 is a schematic diagram showing one connecting terminal of the testing device and the input terminals of the signal lines according to one embodiment of the present invention. The testing device 100 of the present embodiment can further comprise another test substrate 150 configured to test the gate lines of the display panel 101. In this case, a connecting terminal 121, a test contact and a connecting line 140 are formed on the test substrate 150, and the connecting terminal 121 on the test substrate 150 may be an elongated terminal for contacting with all the input terminals 103b of the gate lines (signal lines 103) at the same time. In this case, a length L of the connecting terminal 121 can be longer than an arrangement length of the gate lines or the input terminals 103b, so as to enhance the contacts between the connecting terminal 121 and the input terminals 103b.

Referring to FIG. 1 again, when testing the signal lines 103 or pixels of the display panel 101, the testing device 100 is first provided, and subsequently, the at least one connecting terminal 120 (or 121) can be bonded to the input terminals 103a (or 103b) of the signal lines 103 of the display panel 101 by, for example, an anisotropic conductive film (ACF), thereby forming connections between the signal lines 103 of the display panel 101 and the at least one test contact 130 of the testing device 100. At this time, partial surfaces of the test substrate 110 and/or 150 can be bonded on the substrate 102 of the display panel 101 by the anisotropic conductive film. Subsequently, test signals can be transmitted to the signal lines 103 (data lines and/or gate lines) of the display panel 101 from the at least one test contact 130 of the testing device 100 for testing the display panel 101. When inputting the test signals to the signal lines 103 of the display panel 101, the external test machine or test system can input the different test signals to the display panel 101 through the test contacts 130 (131, 132, 133, 134 or 135) of the testing device 100 for testing the different signal lines or pixels of the display panel 101.

After the display panel 101 passed the test and is recognized as a normal panel, the testing device 100 can be removed from the display panel 101. Therefore, with the use of the testing device 100, the display panel 101 can be tested without arranging shorting bars on the substrate of the display panel 101, so as to enhance a utilization rate of the substrate thereof. Moreover, it is not required to use a laser to cut off the shorting bars, thereby preventing an additional laser cutting process. In addition, with the use of the testing device 100, a spot test or multi-test can be carried out at random or limited to a specific display panel 101 for meeting any test requirement, as well as improving a test quality for the display panel 101.

Figure 4:
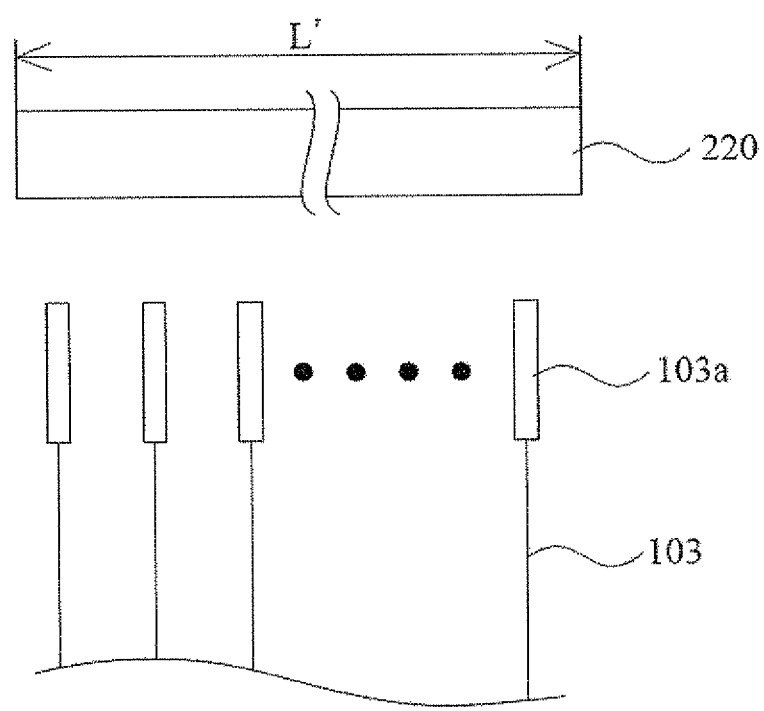
FIG. 4 is a schematic diagram showing a connecting terminal of the testing device and the signal lines of the display panel according to another embodiment of the present invention.

Referring to FIG. 4, a schematic diagram showing a connecting terminal of the testing device and the signal lines of the display panel according to another embodiment of the present invention is illustrated. In another embodiment, an elongated connecting terminal 220 of the testing device 100 is configured to test the data lines of the display panel 101 for contacting with all the input terminals 103a of the data lines (signal lines 103) at the same time. In this case, a length L' of the connecting terminal 220 can be longer than an arrangement length of the data lines or the input terminals 103a, so as to enhance the contacts between the connecting terminal 220 and the input terminals 103a.

As described above, the testing device of the present invention can be used for testing the signal lines or pixels of the display panel. With the use of the testing device of the present invention, the display panel can be tested without arranging shorting bars on the substrate thereof, thereby enhancing the utilization rate of the substrate thereof. Moreover, it is not required to use a laser to cut off the shorting bars, thereby preventing an additional laser cutting process. In addition, with the use of the testing device, the spot test or multi-test can be carried out at random or limited to a specific display panel for meeting any test requirement, as well as improving a test quality for the display panel.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A testing device for testing a display panel, comprising:
a test substrate configured to test data lines of the display panel;
a plurality of connecting terminals arranged at one side of the test substrate configured to be connected to signal lines of the display panel, wherein a width of each of the connecting terminals is larger than a width of an input terminal of each of the signal lines, and the width of each of the connecting terminals is less than 300 μ;
at least one test contact disposed on the test substrate; and
at least one connecting line connected between the connecting terminals and the test contact;
wherein the at least one test contact comprises a first test contact, a second test contact, a third test contact, a common voltage test contact, and the first test contact is configured to test red pixels of the display panel, and the second test contact is configured to test green pixels of the display panel, the third test contact is configured to test blue pixels of the display panel, and the common voltage test contact is configured to test common electrodes of the display panel;
wherein, the testing device further comprises another test substrate configured to test gate lines of the display panel, and a connecting terminal on the another test substrate is an elongated terminal for contacting with input terminals of the gate lines, and a length of the connecting terminal on the another test substrate is longer than an arrangement length of the gate lines, a pitch between each adjacent two of the connecting terminals is identical Co a pitch between each adjacent two of the signal lines.

2. The testing device according to Claim 1, wherein the test substrate is a printed circuit board (PCB) or a flexible printed circuit (FPC) board.

3. A testing device for testing a display panel, comprising:
a test substrate configured to test data lines of the display panel;
at least one connecting terminal arranged at one side of the test substrate configured to be connected to signal lines of the display panel;
at least one test contact disposed on the test substrate; and
at least one connecting line connected between the connecting terminals and the test contact;
wherein the at least one test contact comprises a first test contact, a second test contact, a third test contact, a common voltage test contact, and the first test contact is configured to test red pixels of the display panel, and the second test contact is configured to test green pixels of the display panel, the third test contact is configured to test blue pixels of the display panel, and the common voltage test contact is configured, to test common electrodes of the display panel;
wherein, the testing device further comprises another test substrate configured to test gate lines of the display panel, and a connecting terminal on the another test substrate is an elongated terminal for contacting with input terminals of the gate lines, and a length of the connecting terminal on the another test substrate is longer than an arrangement length of the gate lines, the at least one connecting terminal comprises a plurality of connecting terminals, and a pitch between each adjacent two of the connecting terminals is identical to a pitch between each adjacent two of the signal lines.

4. The testing device according to claim 3, wherein the test substrate is a printed circuit board (PCB) or a flexible primed circuit (FPC) board.

5. The testing device according to claim 3, wherein a width of each of the connecting terminals is larger than a width of an input terminal of each of the signal lines.

6. The testing device according to claim 3, wherein the width of each of the connecting terminals is less than 300 μ.

7. A testing method for testing a display panel, comprising:
providing a testing device to test data lines of the display panel, wherein the testing device comprises a test substrate, at least one connecting terminal, at least one test contact, and at least one connecting line, and the connecting terminal is arranged at one side of the test substrate, and the test contact is disposed on the test substrate, and the connecting line is connected between the connecting terminals and the test contact, and the at least one test contact comprises a first test contact, a second test contact, a third test contact, a common voltage test contact, and the first test contact is configured to test red pixels of the display panel, and the second test Contact is configured to test green pixels of the display panel, and the third test contact is configured to test blue pixels of the display panel, and the common voltage test contact is configured to test common electrodes of the display panel;
providing another test substrate to test gate lines of the display panel, wherein a connecting terminal on the another test substrate is an elongated terminal for contacting with input terminals of the gate lines, and a length of the connecting terminal on the another test substrate is longer than an arrangement length of the gate lines;
bonding the connecting terminal of the testing device to the data lines of the display panel;
bonding the connecting terminal of the another testing device to the gate lines of the display panel; and
inputting test signals to the data lines and the gate lines of the display panel through the test contacts of the testing device;
wherein, the connecting terminals of the testing device is bonded to the data lines of the display panel by an anisotropic conductive film, and a pitch between each adjacent two of the connecting terminals is identical to a pitch between each adjacent two of the signal lines.

* * * * *

UNITED STATES PATENT AND TRADEMARK OFFICE
CERTIFICATE OF CORRECTION

PATENT NO. : 9,536,459 B2  
APPLICATION NO. : 13/703356  
DATED : January 3, 2017  
INVENTOR(S) : Songxian Wen Page 1 of 1

It is certified that error appears in the above-identified patent and that said Letters Patent is hereby corrected as shown below:

In the Claims

Claim 1, Column 6 should be corrected as follows:  
Line 3: Change:  
-- 300µ --  
To:  
"300µm"

Claim 6, Column 6 should be corrected as follows:  
Line 67: Change:  
-- 300µ --  
To:  
"300µm"

Signed and Sealed this  
Twenty-sixth Day of September, 2017

Joseph Matal  
*Performing the Functions and Duties of the*  
*Under Secretary of Commerce for Intellectual Property and*  
*Director of the United States Patent and Trademark Office*